US011965472B1

United States Patent
(12) United States Patent
Kiwan et al.
(10) Patent No.: US 11,965,472 B1
(45) Date of Patent: Apr. 23, 2024

(54) VEHICLE CONTROL WITH INDIVIDUAL ENGINE CYLINDER ENABLEMENT FOR AIR-FUEL RATIO IMBALANCE MONITORING AND DETECTION

(71) Applicant: Ford Global Technologies, LLC, Dearborn, MI (US)

(72) Inventors: Rani Kiwan, Canton, MI (US); Sitaram Rejeti, Canton, MI (US); Adam Joseph Krach, Canton, MI (US); Andrew Bagnasco, Plymouth, MI (US); Patrick Edward Smithberger, Marine City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/078,462

(22) Filed: Dec. 9, 2022

(51) Int. Cl.
*F02D 41/14* (2006.01)

(52) U.S. Cl.
CPC ..... *F02D 41/1443* (2013.01); *F02D 41/1454* (2013.01); *F01N 2560/025* (2013.01); *F02D 2200/101* (2013.01)

(58) Field of Classification Search
CPC ............. F02D 41/1443; F02D 41/1454; F02D 2200/101; F01N 2560/025
See application file for complete search history.

(56) References Cited

U.S. PATENT DOCUMENTS

| | | | | |
|---|---|---|---|---|
| 5,524,598 | A * | 6/1996 | Hasegawa | F02D 41/1401 123/672 |
| 10,337,430 | B2 | 7/2019 | Jammoussi et al. | |
| 2002/0026930 | A1* | 3/2002 | Ueno | F02D 41/1481 123/679 |
| 2005/0056266 | A1 | 3/2005 | Ikemoto et al. | |
| 2012/0053820 | A1* | 3/2012 | Nishikiori | F02D 41/0087 701/103 |
| 2013/0179051 | A1* | 7/2013 | Tomimatsu | F02D 17/02 701/104 |
| 2013/0283787 | A1* | 10/2013 | Sakata | F02D 41/1456 60/605.1 |
| 2016/0258375 | A1 | 9/2016 | Jammoussi et al. | |
| 2017/0356363 | A1 | 12/2017 | Jammoussi et al. | |

* cited by examiner

*Primary Examiner* — Audrey B. Walter
(74) *Attorney, Agent, or Firm* — Brooks Kushman PC; Vincent Mastrogiacomo

(57) ABSTRACT

A vehicle includes an internal combustion engine having a plurality of cylinders, a sensor configured to generate a sensor signal correlated with an air-fuel ratio of first and second cylinders of the plurality of cylinders, and a controller in communication with the sensor and programmed to monitor the air-fuel ratio of the first cylinder in response to an indication that air-fuel ratio measurements of the first cylinder satisfy predetermined criteria for current engine operating conditions while air-fuel ratio measurements of the second cylinder do not satisfy the predetermined criteria for the current engine operating conditions.

19 Claims, 5 Drawing Sheets

| Ref. | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| 410 | Cycle № | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 412 | Speed-Load Pt. | 1 | 1 | 1 | 1 | 1 | 2 | 2 | 3 | 3 | 3 | 3 | 1 | 1 | 4 | 4 | 4 | 1 | 1 | 1 | 1 | 1 | 2 | 2 | 2 | 3 |
| 414 | Cyl. №1: Detectable Fault? | | | | | | | | | | | | | | | | | | | | | | | | | |
| 416 | Cyl. №2: Detectable Fault? | | | | | | | | | | | | | | | | | | | | | | | | | |
| 418 | Cyl. №3: Detectable Fault? | | | | | | | | | | | | | | | | | | | | | | | | | |
| 420 | Cyl. №4: Detectable Fault? | | | | | | | | | | | | | | | | | | | | | | | | | |
| 422 | Right Bank: Detectable Fault? | | | | | | | | | | | | | | | | | | | | | | | | | |
| 430, 432 | Current Diagnostic – Cycle Count | 1 | 2 | 3 | 4 | 5 | 5 | 5 | 5 | 5 | 5 | 5 | 6 | 7 | 7 | 7 | 7 | 8 | 9 | 10 | - | - | - | - | - | - |
| 434 | Current Diagnostic – Complete? | X | X | X | X | X | X | X | X | X | X | X | X | X | X | X | X | X | X | ✓ | ✓ | ✓ | ✓ | ✓ | ✓ | ✓ |
| 440 | Cyl. №1: Cycle Count | 1 | 2 | 3 | 4 | 5 | 5 | 5 | 6 | 7 | 8 | 9 | 10 | - | - | - | - | - | - | - | - | - | - | - | - | - |
| 442 | Cyl. №2: Cycle Count | 1 | 2 | 3 | 4 | 5 | 5 | 5 | 6 | 7 | 8 | 9 | 10 | - | - | - | - | - | - | - | - | - | - | - | - | - |
| 444 | Cyl. №3: Cycle Count | 1 | 2 | 3 | 4 | 5 | 5 | 5 | 5 | 5 | 5 | 5 | 6 | 7 | 8 | 9 | 10 | - | - | - | - | - | - | - | - | - |
| 446 | Cyl. №4: Cycle Count | 1 | 2 | 3 | 4 | 5 | 5 | 5 | 6 | 7 | 8 | 9 | 10 | - | - | - | - | - | - | - | - | - | - | - | - | - |
| 450 | Diagnostic Complete? | X | X | X | X | X | X | X | X | X | X | X | X | X | X | X | ✓ | ✓ | ✓ | ✓ | ✓ | ✓ | ✓ | ✓ | ✓ | ✓ |

FIG. 4

VEHICLE CONTROL WITH INDIVIDUAL ENGINE CYLINDER ENABLEMENT FOR AIR-FUEL RATIO IMBALANCE MONITORING AND DETECTION

TECHNICAL FIELD

This disclosure relates to operation of a vehicle having a multi-cylinder internal combustion engine to identify an air-fuel ratio imbalance among cylinders.

BACKGROUND/SUMMARY

Engine air-fuel ratio can be controlled to provide desired catalyst performance, reduce emissions, and increase engine fuel efficiency. Control of air-fuel ratio (AFR) in engine cylinders may include monitoring of exhaust gas oxygen by one or more exhaust gas oxygen (EGO) sensors and adjusting fuel and/or charge air parameters. However, multi-cylinder engines may include a single sensor (EGO or other sensor) associated with multiple (or all) cylinders such that it may be difficult to determine which of the cylinders associated with a particular sensor is contributing to an AFR imbalance. Various strategies have been developed to detect which cylinders are responsible for an AFR imbalance, such as monitoring EGO sensor signals while controlling individual cylinders during fuel shut-off (DFSO), for example, as described in U.S. Ser. No. 10/337,430B2. AFR imbalance can also be monitored using methods based on crankshaft position. However, transient changes in torque demand (such as from various engine accessory loads) and purge errors may limit the conditions under which monitoring may be performed.

Reliable detection of smaller AFR imbalances facilitates better emissions control while reducing unnecessary interventions such as alerting the driver or controlling the engine in a manner that may adversely affect performance or fuel economy expectations, for example. One prior art strategy for AFR imbalance detection uses a speed-load enablement grid to specify the particular operating conditions where faults from all cylinders sharing the same sensor can be reliably detected. This enablement grid is restricted by the worst cylinder of the group and therefore may require multiple engine cycles (e.g., 100-400) to complete, reducing the desired completion rate.

The present inventors have recognized that while various existing diagnostic strategies may not be able to identify the cylinder with a fault except under conditions where all cylinders associated with a sensor satisfy predetermined criteria, data collected offline may be used to determine a subset of cylinders for a particular engine operating conditions (such as a speed-load point) for which an AFR imbalance can be reliably detected. As such, one or more embodiments according to the present disclosure use an individual cylinder-based enablement grid, where the AFR imbalance detection is enabled only for the detectable subset of cylinders at a given engine operating point. The diagnostic is considered complete when measurements over a predetermined number of cycles (e.g., 100-400) are completed for each cylinder. The cycles are not necessarily exclusive for any particular cylinder. Rather, the measurements from the same cycle are included for multiple cylinders within the subset of cylinders determined to have reliable detection for that operating condition. This strategy may have various associated advantages including but not limited to expanding AFR imbalance monitoring beyond conditions limited to the detectability of the weakest cylinder of a cylinder group and improving the desired diagnostic completion rate.

In view of the above, the inventors herein have developed a system and method for controlling a vehicle having a multi-cylinder internal combustion engine to activate an AFR monitor in response to an indication that a current engine operating point includes at least one cylinder previously determined to have a reliably detectable AFR based on a sensor signal associated with a group of cylinders that includes the at least one cylinder for the current engine operating point, and at least one cylinder that does not have a reliably detectable AFR based on the sensor signal.

In various embodiments, a vehicle includes an internal combustion engine having a plurality of cylinders, a sensor configured to generate a sensor signal correlated with an air-fuel ratio of first and second cylinders of the plurality of cylinders, and a controller in communication with the sensor and programmed to monitor the air-fuel ratio of the first cylinder in response to an indication that air-fuel ratio measurements of the first cylinder satisfy predetermined criteria for current engine operating conditions while air-fuel ratio measurements of the second cylinder do not satisfy the predetermined criteria for the current engine operating conditions. The controller may be further programmed to retrieve the indication from a lookup table identifying which of the plurality of cylinders satisfy the predetermined criteria for the current engine operating conditions. The current engine operating conditions may correspond to one of a plurality of predetermined engine speed-load regions, each of the plurality of cylinders associated with at least one of the speed-load regions where air-fuel ratio measurements satisfy the predetermined criteria and at least one of the engine speed-load regions includes the indication that air-fuel ratio measurements satisfy the predetermined criteria for a subset of the plurality of cylinders, the subset including less than all of the plurality of cylinders. The controller may be further programmed to: repeatedly monitor the air-fuel ratio for cylinders indicated as satisfying the predetermined criteria for the current operating conditions as engine operating conditions vary until obtaining a predetermined number of air-fuel ratio measurements for each of the plurality of cylinders. The controller may be programmed to generate a diagnostic code in response to an air-fuel ratio imbalance exceeding a corresponding threshold after obtaining the predetermined number of air-fuel ratio measurements for each of the plurality of cylinders. In various embodiments, the sensor comprises an exhaust gas oxygen sensor, which may include a universal exhaust gas oxygen (UEGO) sensor, or a heated exhaust gas oxygen (HEGO) sensor. The air-fuel ratio measurements or determinations may be computed by the controller based on a measure of variation of signals from the sensor within an engine cycle. The predetermined criteria may correspond to a rate of false-positives being less than a first threshold and a rate of false-negatives being less than a second threshold as determined offline using a test engine having the same number and configuration of cylinders and sensor with one or more additional test sensors to compare results.

Embodiments according to the disclosure may also include a method for controlling a vehicle having an internal combustion engine including a plurality of cylinders with at least a first and second cylinder of the plurality of cylinders associated with a sensor configured to provide a signal used in determining air-fuel ratio of the first and second cylinders, the method comprising, by a vehicle controller: monitoring air-fuel ratio of cylinders previously identified as having air-fuel ratio determinations that satisfy predetermined criteria for current engine operating conditions, the previously identified cylinders including only one of the first and second cylinders for at least one engine operating condition; repeating the monitoring as engine operating conditions change until each of the plurality of cylinders has a predetermined number of air-fuel ratio determinations; and generating a diagnostic signal in response to an air-fuel ratio variation among the plurality of cylinders exceeding an associated threshold. The method may include the controller accessing a lookup table to select cylinders previously identified as having air-fuel ratio determinations that satisfy predetermined criteria for the current engine operating conditions, the lookup table indexed by an engine speed-load region corresponding to the current engine operating conditions. In various embodiments, the vehicle sensor is a universal exhaust gas oxygen (UEGO) sensor, wherein monitoring the air-fuel ratio comprises computing a metric based on a measure of fluctuation of signals from the sensor within an engine cycle. The predetermined criteria may correspond to a rate of false-positives and false-negatives for generating the diagnostic signal as determined by comparing data collected from a test engine using one or more additional sensors to verify the air-fuel ratio indication of the engine sensor used in production at various engine operating points. The method may include calculating an average air-fuel ratio variation among the plurality of cylinders, wherein generating the diagnostic signal is in response to the average air-fuel ratio variation exceeding the associated threshold.

Embodiments according to the disclosure may also include a method for controlling a vehicle including a multi-cylinder internal combustion engine having a sensor associated with a group of cylinders, comprising, by a vehicle controller: selecting a subset of cylinders containing less than all of the group of cylinders for air-fuel ratio monitoring, the subset including cylinders previously identified as having reliable air-fuel ratio determinations based on signals from the sensor for a current engine speed-load operating region; repeating the selecting of subsets of cylinders for different engine speed-load operating regions until all of the cylinders of the engine have a predetermined number of air-fuel ratio determinations; and generating an air-fuel ratio imbalance signal in response to a difference among the air-fuel ratio determinations for different cylinders exceeding a corresponding threshold. Selecting the subset of cylinders may include retrieving a list of cylinders from a previously stored lookup table accessed by the current engine speed-load operating region. The method may also include identifying cylinders as having reliable air-fuel ratio determinations by measuring air-fuel ratio of each cylinder using a second sensor for each of a plurality of engine speed-load regions for a representative test engine having a same number of cylinders as the multi-cylinder internal combustion engine. Alternatively, or in combination, an air-fuel ratio imbalance may be artificially introduced by adjusting commanded fuel for a particular. For example, a 20% lean/rich imbalance on a first cylinder can be introduced by decreasing/increasing the commanded fuel mass for the first cylinder by 20%. Because the artificially introduced imbalance is known, the reliability of detection can be evaluated using a single sensor. Identifying cylinders as having reliable air-fuel ratio determinations may include excluding cylinders having a false-positive rate above a corresponding threshold, the false-positive rate associated with determining an air-fuel ratio imbalance above a corresponding threshold based on signals from the sensor associated with the group of cylinders while no actual air-fuel ratio imbalance is detected based on signals from the second sensor. Similarly, identifying cylinders as having reliable air-fuel ratio determinations may include excluding cylinders having a false-negative rate above a corresponding threshold, the false-negative rate associated with detecting an air-fuel ratio imbalance based on signals from the second sensor but not the sensor associated with the group of cylinders.

The above discussion includes recognitions made by the inventors and not admitted being generally known. It should be understood that the summary above is provided to introduce in simplified form a selection of concepts that are further described in the detailed description. It is not meant to identify key or essential features of the claimed subject matter, the scope of which is defined by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 illustrates operation of an air-fuel ratio imbalance monitoring strategy according to the present disclosure relative to a prior art strategy.

DETAILED DESCRIPTION

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

The processes, methods, or algorithms disclosed herein can be deliverable to/implemented by a processing device, processor, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as RAM devices, FLASH devices, MRAM devices and other non-transitory optical media. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components. While the algorithms, processes, methods, or steps may be illustrated and/or described in a sequential matter, various steps or functions may be performed simultaneously or based on a trigger or interrupt resulting in a different sequence or order than illustrated and described. Some processes, steps, or functions may be repeatedly performed whether or not illustrated as such. Similarly, various processes, steps, or functions may be omitted in some applications or implementations.

Figure 1:
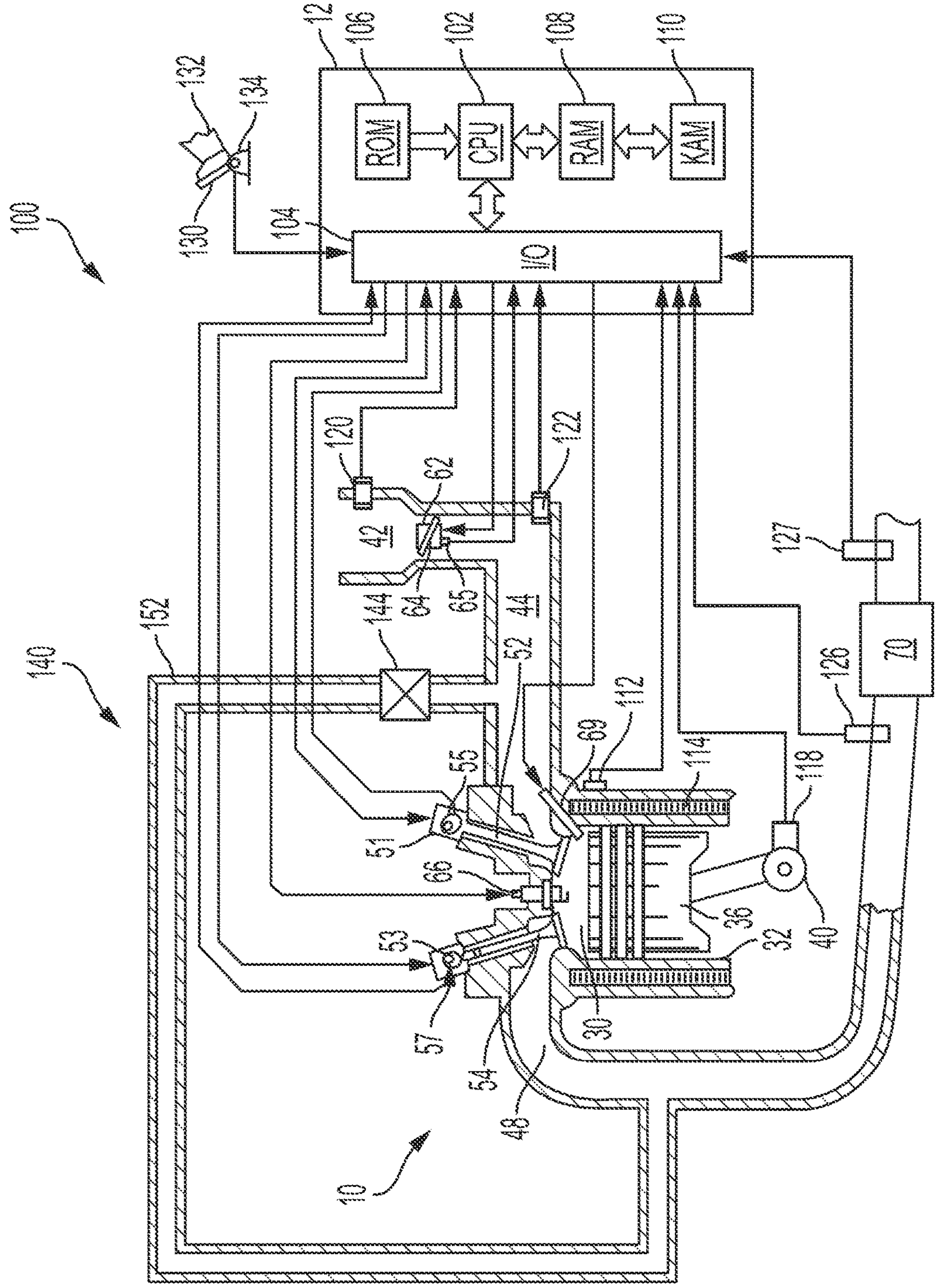
FIG. 1 is schematic diagram of a vehicle having a multi-cylinder internal combustion engine with an air-fuel ratio monitor according to the disclosure.

FIG. 1 is a schematic diagram showing one cylinder of a multi-cylinder engine 10 in an engine system 100, which may be included in a propulsion system of a vehicle, such as an automobile, for example. The engine 10 may be controlled at least partially by a control system including a controller 12 and by input from a vehicle operator 132 via an input device 130. In this example, the input device 130 includes a throttle pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30. The claimed subject matter is not limited to direct injection systems and may also be included in various other configurations, such as a port injection system, for example.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. Further, another exhaust gas sensor 127 is shown coupled to the exhaust passage 48 downstream of an emission control device 70 according to a direction of exhaust flow. The sensors 126 and 127 may be any suitable sensor for providing an indication of exhaust gas air-fuel ratio such as a linear oxygen sensor or a universal or wide-range exhaust gas oxygen (UEGO), a two-state oxygen sensor or EGO, a heated exhaust gas oxygen (HEGO). In one example, upstream exhaust gas sensor 126 is a UEGO sensor and 127 is a HEGO sensor, both exhaust gas sensors configured to provide output, such as a voltage signal, that is proportional to the amount of oxygen present in the exhaust. Controller 12 converts oxygen sensor output into exhaust gas air-fuel ratio via an oxygen sensor transfer function.

In another example, UEGO sensor 126 coupled upstream of the catalyst is configured to identify air-fuel imbalances that will result in inaccurate burning of fuel at a face of a first brick of the catalyst. The HEGO sensor 127 coupled downstream of the catalyst is configured to infer air-fuel imbalances that result from inaccurate burning of fuel at the face of a second brick of the catalyst. As such, the exhaust gas received at the HEGO sensor tends to be hotter than the exhaust gas received at the UEGO sensor.

The emission control device 70 is shown arranged along the exhaust passage 48 downstream of the exhaust gas sensor 126 and upstream of the exhaust gas sensor 127. The device 70 may be a three-way catalyst (TWC), $NO_x$ trap, various other emission control devices, or combinations thereof. In some examples, during operation of the engine 10, the emission control device 70 may be periodically reset by operating at least one cylinder of the engine within a particular air-fuel ratio.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to adjust the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. One or more of the storage media may include a lookup table or similar data storage represented by the AFR imbalance monitor enablement grid described herein. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing instructions executable by the processor 102 for performing the methods described herein as well as other variants that are anticipated but not specifically described or illustrated, but within the scope of the claimed subject matter as understood by those of ordinary skill in the art.

During operation, each cylinder within engine 10 typically undergoes a four-stroke cycle including: an intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 66, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples. As previously described, FIG. 1 shows only one cylinder of a multi-cylinder engine, and each cylinder may similarly include its own set of intake/exhaust valves, fuel injector, spark plug, etc.

As described in greater detail herein, controller 12 activates an AFR monitor in response to an indication that a current engine operating point includes at least one cylinder previously determined to have a reliably detectable AFR based on a sensor signal associated with a group of cylinders that includes the at least one cylinder for the current engine operating point, and at least one cylinder that does not have a reliably detectable AFR based on the sensor signal.

Figure 2:
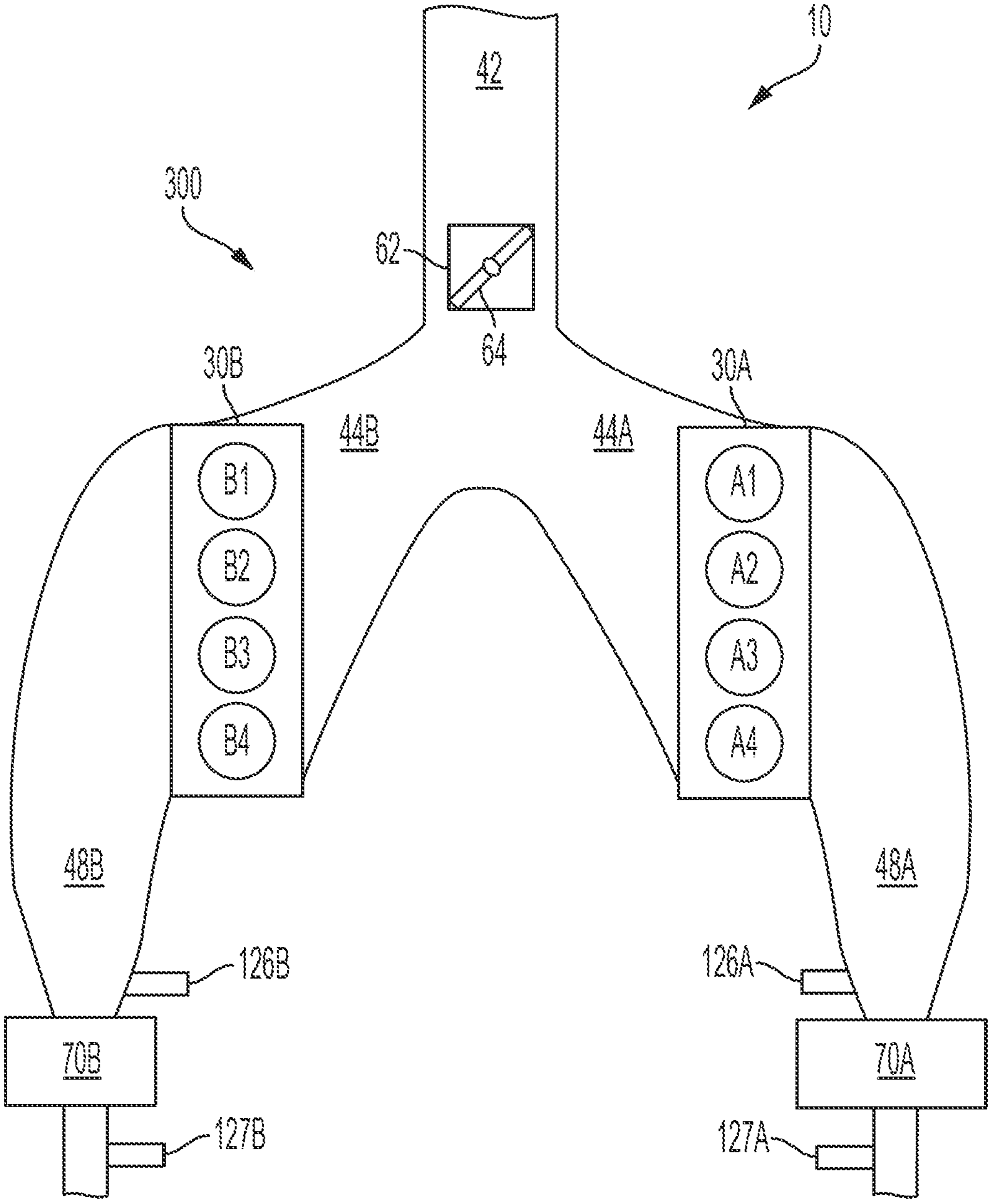
FIG. 2 is a schematic diagram illustrating an eight-cylinder engine with two cylinder banks.

FIG. 2 shows an example version 300 of engine 10 that includes multiple cylinders arranged in a V configuration. In this example, engine 10 is configured as a variable displacement engine (VDE). Engine 10 includes a plurality of combustion chambers or cylinders 30. The plurality of cylinders 30 of engine 10 are arranged as groups of cylinders on distinct engine banks. In the depicted example, engine 10 includes two engine cylinder banks 30A, 30B. Thus, the cylinders are arranged as a first group of cylinders (four cylinders in the depicted example) arranged on first engine bank 30A and labeled A1-A4, and a second group of cylinders (four cylinders in the depicted example) arranged on second engine bank 30B labeled B1-B4. It will be appreciated that while the example depicted in FIG. 2 shows a V-engine with cylinders arranged on different banks, this is not meant to be limiting, and in alternate examples, the engine may be an in-line engine with all engine cylinders on a common engine bank. Similarly, various engine configurations may include a different number of cylinders than illustrated, including but not limited to three-cylinder, four-cylinder, six-cylinder, ten-cylinder, and twelve-cylinder configurations.

Engine 10 can receive intake air via an intake passage 42 communicating with branched intake manifold 44A, 44B. Specifically, first engine bank 30A receives intake air from intake passage 42 via a first intake manifold 44A while second engine bank 30B receives intake air from intake passage 42 via second intake manifold 44B. While engine banks 30A, 30B are shown with a common intake manifold, it will be appreciated that in alternate examples, the engine may include two separate intake manifolds. The amount of air supplied to the cylinders of the engine can be controlled by adjusting a position of throttle 62 on throttle plate 64. Additionally, an amount of air supplied to each group of cylinders on the specific banks can be adjusted by varying an intake valve timing of one or more intake valves coupled to the cylinders. Similarly, while engine 10 is illustrated as a naturally aspirated engine in this example, other configurations are possible including turbocharged and supercharged configurations, for example.

Combustion products generated at the cylinders of first engine bank 30A are directed to one or more exhaust catalysts in first exhaust manifold 48A where the combustion products are treated before being vented to the atmosphere. A first emission control device 70A is coupled to first exhaust manifold 48A. First emission control device 70A may include one or more exhaust catalysts, such as a close-coupled catalyst. In one example, the close-coupled catalyst at emission control device 70A may be a three-way catalyst. Exhaust gas generated at first engine bank 30A is treated at emission control device 70A.

Combustion products generated at the cylinders of second engine bank 30B are exhausted to the atmosphere via second exhaust manifold 48B. A second emission control device 70B is coupled to second exhaust manifold 48B. Second emission control device 70B may include one or more exhaust catalysts, such as a close-coupled catalyst. In one example, the close-coupled catalyst at emission control device 70B may be a three-way catalyst. Exhaust gas generated at second engine bank 30B is treated at emission control device 70B.

Geometry of the exhaust manifold may affect exhaust gas sensor measurements of an air-fuel ratio of a cylinder during nominal engine operation. During nominal engine operation (e.g., all engine cylinders operating at stoichiometry), the geometry of the exhaust manifold and cylinder firing order may allow the air-fuel ratio of certain cylinders of an engine bank to have a greater influence on measurements than other cylinders of the same bank, thus reducing sensitivity of the exhaust gas sensor to detect an air-fuel ratio imbalance of an individual cylinder. For example, engine bank 30A comprises four cylinders A1, A2, A3, and A4. During nominal engine operation, exhaust gas from A1 may flow toward a side of the exhaust manifold nearest an upstream exhaust gas sensor 126A and therefore, provide a strong, accurate exhaust sensor readings. However, during nominal engine operation, exhaust gas from A1 may flow toward a side of the exhaust manifold nearest a downstream exhaust gas sensor 127A and therefore, provide another strong, accurate exhaust sensor reading. In this way, an air-fuel ratio imbalance in a cylinder group may be detected with accuracy during nominal engine operation.

As explained in greater detail herein, the present inventors have analyzed off-line engine operating data to identify which cylinders have robust AFR measurement signals at particular engine operating points (or within predetermined operating regions) such that measurements for those cylinders may be recorded even though other cylinders within the group do not have measurements that meet predetermined criteria for recording. This results in fewer overall engine cycles to obtain a desired minimum number of measurements for each cylinder as compared to the prior monitoring/measurement strategy (best illustrated in FIG. 5). Furthermore, the vehicle control strategy according to the present disclosure does not require deactivation or shutoff of some cylinders during DFSO to obtain robust measurements of other cylinders to identify AFR imbalance. While the DFSO strategy may be suitable in some applications, it may also extend the total number of engine cycles required for completion of the diagnostic relative to the monitor activation control strategy described herein.

While FIG. 2 shows each engine bank coupled to a respective underbody emission control device, in alternate examples, each engine bank may be coupled to respective emission control devices 70A, 70B but to a common underbody emission control device positioned downstream in a common exhaust passageway.

Various sensors may be coupled to V-8 engine 300. For example, a first exhaust gas sensor 126A may be coupled to the first exhaust manifold 48A of first engine bank 30A, upstream of first emission control device 70A while a second exhaust gas sensor 126B is coupled to the second exhaust manifold 48B of second engine bank 30B, upstream of second emission control device 70B. In further examples, a first exhaust gas sensor 127A may be couple to first exhaust manifold 48A of first engine bank 30A, downstream of first emission control device 70A while a second exhaust gas sensor 127B is coupled to the second exhaust manifold 48B of second engine bank 30B, downstream of the second emission control device 70B. Still other sensors, such as temperature sensors, may be included, for example, coupled to the underbody emission control device(s). As previously described, the exhaust gas sensors 126A, 126B, 127A and 127B may include exhaust gas oxygen sensors, such as EGO, HEGO and/or UEGO sensors.

FIGS. 3A-3E illustrate representative engine speed-load regions where sensor signals have been determined to meet predetermined criteria for air-fuel ratio monitoring of corresponding cylinders 1-4 (FIGS. 3A-3D) of a right cylinder bank (FIG. 3E) in a representative V-8 engine. The air-fuel ratio imbalance monitor (AFRIM) is an on-board diagnostic (OBD) that may be required by various administrative agencies or jurisdictions. The vehicle controller performs the diagnostic to detect an AFR imbalance among cylinders and generates a corresponding diagnostic signal that may be used to illuminate a malfunction indication light (MIL) and/or store a diagnostic code for use by service technicians. As an example, an AFR imbalance (on any cylinder) that may generate a diagnostic code may be associated with an AFR that results in emissions exceeding a corresponding threshold, such as an AFR that is 20% lean or 25% rich, for examples. Of course, the threshold may vary based on the particular vehicle and the requirements of the administrative agency or jurisdiction for a particular vehicle or application.

The diagnostic should not generate a corresponding diagnostic signal for nominal AFR imbalances, such as those due to part-to-part variability (i.e. a false-positive result). The AFR imbalance diagnostic measurement or metric may be a calculated or computed metric based on a measure of fluctuation of a fast-sampled AFR or X. (ratio of AFR to stoichiometric) within an engine cycle from a sensor associated with a group of cylinders, such as a UEGO sensor, for example. The signal strength is a function of mixing of exhaust pulses from cylinders and will vary with engine speed and load. As such, the AFR detection reliability and subset of cylinders with reliable detection may also vary with speed and load. Other metrics are possible, such as using a crank-position sensor, depending on the particular application and implementation.

Criteria for a reliable diagnostic may be quantified in terms of a rate of false-positives and false-negatives being below associated thresholds (e.g., rates of false-positives and false-negatives less than 0.1%). Different rates may be specified for each threshold in some applications. Because measurements over only one engine cycle often exhibit a high level of variability, and to reduce the effect of measurement noise, measurements spanning multiple engine cycles may be combined by a mathematical or statistical calculation, such as averaging or integrating the metric over multiple engine cycles (e.g., 100-400 cycles).

Figure 3A:
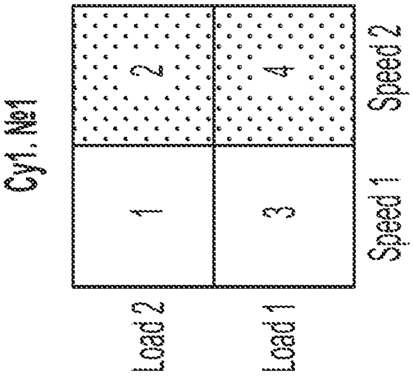
FIG. 3A illustrates representative engine speed-load regions where sensor signals meet predetermined criteria for air-fuel ratio imbalance monitoring of a first cylinder.
Figure 3B:
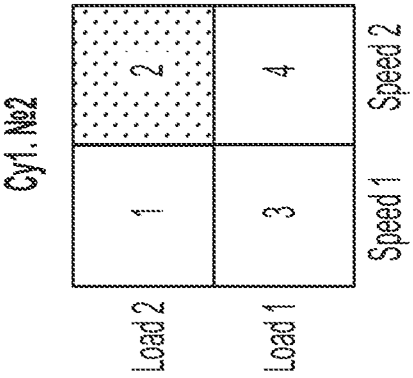
FIG. 3B illustrates representative engine speed-load regions where sensor signals meet predetermined criteria for air-fuel ratio imbalance monitoring of a second cylinder.
Figure 3C:
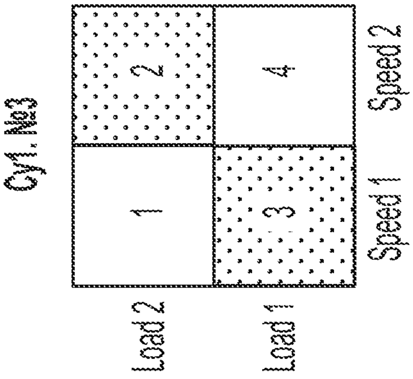
FIG. 3C illustrates representative engine speed-load regions where sensor signals meet predetermined criteria for air-fuel ratio imbalance monitoring of a third cylinder.
Figure 3D:
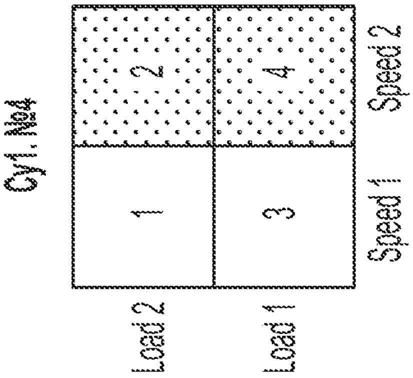
FIG. 3D illustrates representative engine speed-load regions where sensor signals meet predetermined criteria for air-fuel ratio imbalance monitoring of a fourth cylinder.

The engine may include a sensor used to determine air-fuel ratio for associated cylinders of the group/bank as illustrated and described with reference to FIG. 2, such as an EGO, HEGO, or UEGO sensor for example. In the simplified example illustrated, only four speed-load points or regions are shown. Typical applications may include a finer mesh grid (e.g., 5×6 or 7×9). At each speed-load point, the minimum of an imbalance signal that would generate a diagnostic code is compared to the maximum of a nominal imbalance signal from all cylinders in the group, i.e. all cylinders sharing the same sensor, which in this example would be the cylinders on the same side or in the same cylinder bank of the V-configuration. Air-fuel ratio imbalance monitoring is reliable or meets predetermined criteria for reliability for a particular cylinder where indicated by a plain/white background, while speed-load points or regions where the imbalance monitoring does not meet the predetermined criteria for that cylinder is indicated by the dotted background. For example, as shown in FIG. 3A, the AFRIM is active/enabled for cylinder 1 when the engine is operating in speed-load regions 1 and 3, while being inactive/disabled when the engine is operating in speed-load regions 2 and 4. Similarly, as shown in FIG. 3B, the AFRIM is active/enabled for cylinder 2 for speed-load regions 1, 3, and 4, while being inactive/disabled for speed-load region 2. As used herein, active/enabled indicates that the measurement or metric is included in determining whether to generate a diagnostic code, while inactive/disabled indicates that the measurement or metric is either not computed or not included in determining whether to generate the diagnostic code.

The reliability of the metric based on a particular sensor under selected speed-load operating conditions is determined off-line for a representative test engine with air-fuel ratio measurements obtained from additional test sensors or with known air-fuel ratio imbalance artificially introduced on a cylinder by varying the injected fuel mass of the cylinder from stoichiometric on a dynamometer or similar testing arrangement to determine whether the group/bank sensor provides a reliable indication for monitoring air-fuel ratio imbalance for each cylinder associated with that group/bank sensor at each specified speed-load point. This information may then be stored in a lookup table accessible by the controller during engine operation to select or identify which cylinders are suitable for air-fuel ratio imbalance monitoring (active/enabled vs. inactive/disabled) for current engine operating conditions. Those of ordinary skill in the art will recognize that the determination will vary based on the particular engine design and configuration including the number and arrangement of cylinders, firing order, sensor positioning, etc.

Figure 3E:
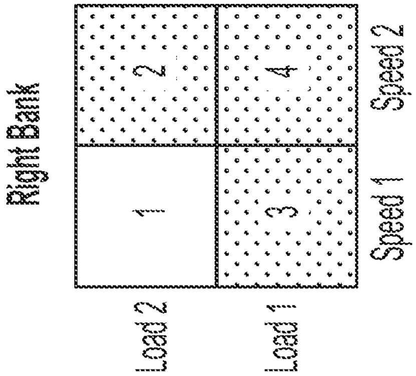
FIG. 3E illustrates representative engine speed-load regions where sensor signals meet predetermined criteria for air-fuel ratio imbalance monitoring of a right cylinder bank.

As generally represented in FIG. 3E, the enablement criteria of the prior art strategy enabled the diagnostic monitoring only when all cylinders of the group (cylinder bank in this example) satisfied the predetermined criteria.

FIG. 4 illustrates operation of an air-fuel ratio imbalance monitoring strategy according to the present disclosure relative to a prior art strategy. Those of ordinary skill in the art will recognize that the information contained in the AFRIM cylinder enablement grid using the cylinder AFR reliability information from FIGS. 3A-3E may be stored in a lookup table accessed by a vehicle controller to identify or select a subset of cylinders (including at least one cylinder) associated with a particular sensor used in determining an AFR metric for operation of the AFRIM diagnostic. The enablement grid 400 is a simplified example illustrating operation of four cylinders of a right-side cylinder bank in a V-8 engine over 25 engine cycles at various engine operating conditions (speed-load points or regions). Representative applications would include similar information for all engine cylinders and operation over additional engine cycles (such as 100-400 cycles, for example). Additional speed-load points or regions may also be provided as previously described.

For purposes of illustration of system operation and comparison to a prior art strategy, enablement grid 400 includes 25 representative engine cycles as indicated by Cycle No. field 410. Various representative engine operating speed-load points or regions are indicated by Speed-Load Pt. field 412. Actual operation may include more/less engine cycles at any particular speed-load point and the order of operation or transition among speed-load points or regions may vary. Fields 414, 416, 418, 420, and 422 correspond to whether the cylinder/bank has reliably detectable AFR information such that the AFRIM is active/enabled for that engine speed-load point or region as illustrated and described in FIGS. 3A-3E for cylinders 1-4 and right cylinder bank, respectively. For comparison to embodiments according to the present disclosure, a prior art AFRIM enablement strategy 430 is illustrated showing the Cycle Count 432 for which tracks the cumulative number of engine cycles where the monitor is enabled, and whether the monitor is Complete 434. As previously described, this prior art strategy obtains measurements only for operating conditions where all cylinders associated with a single sensor have been identified as having reliable AFR determinations, i.e. when Right Bank 422, which includes cylinders 1-4 is indicated as having reliable AFR determinations. The capability of monitoring in this strategy is restricted by the worst right-bank cylinder. In this example, the prior art monitor is completed when ten measurements have been obtained for every cylinder, as indicated at engine Cycle No. 19.

Fields 440, 442, 444, and 446 track cumulative cycle counts for cylinders 1-4 respectively where the AFRIM diagnostic is active according to embodiments of the present disclosure where a subset of cylinders associated with a single sensor may be monitored. For example, with reference to engine Cycle Nos. 8-11, the individual cylinder approach according to the present disclosure obtains AFR determinations for use in the AFRIM diagnostic monitor for a subset of the cylinders of the right cylinder bank including cylinders 1, 2, and 4, but not cylinder 3. Because cylinder 3 was determined not to have reliable AFR determinations at engine operating speed-load point 3, the prior art strategy would not enable the AFRIM diagnostic for these engine cycles. As indicated by the Diagnostic Complete field 450, the individual cylinder enablement strategy according to the disclosure would be completed (i.e. 10 AFR determinations obtained for every cylinder) at engine Cycle No. 16 as compared to Cycle No. 19 completion by the prior art strategy.

Figure 5:
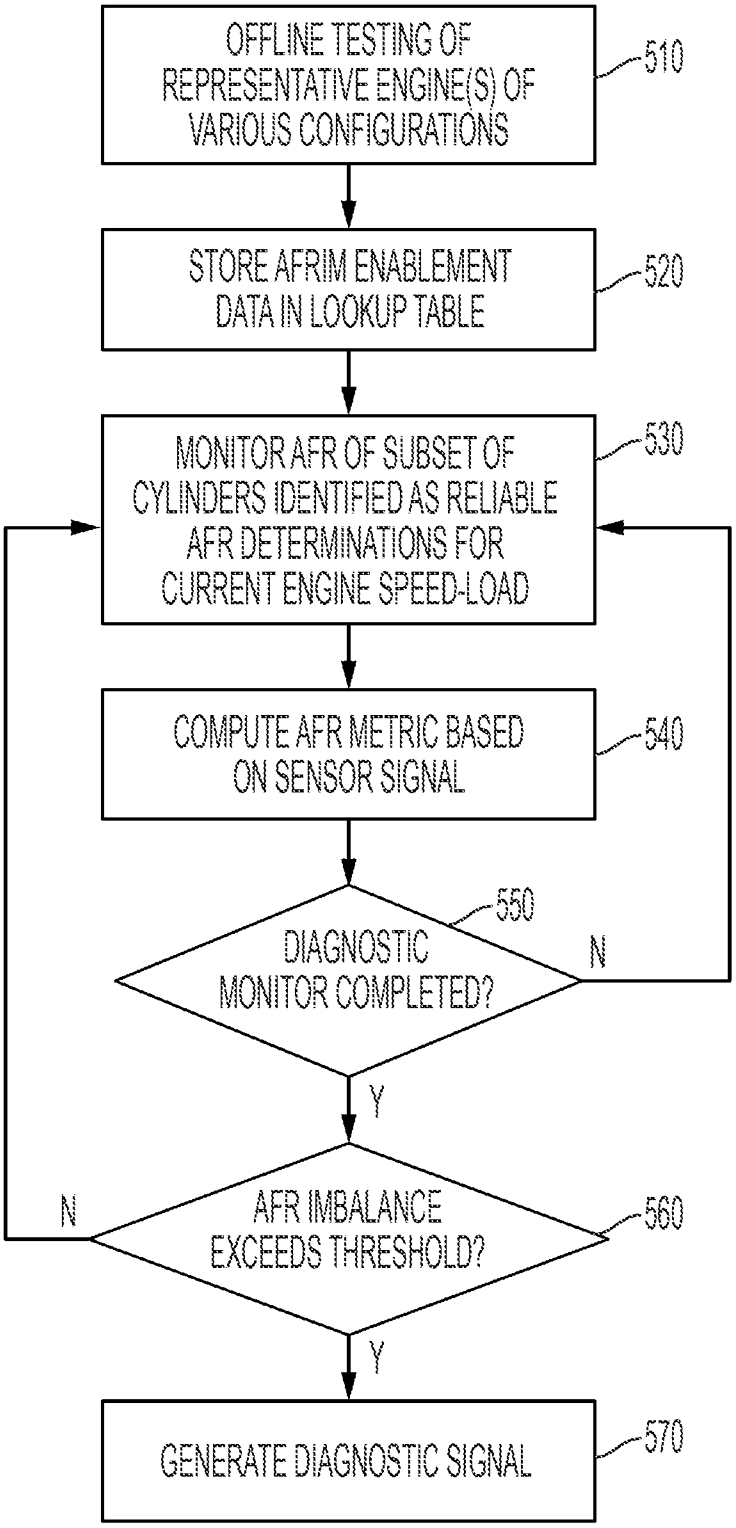
FIG. 5 is a block diagram illustrating operation of a system or method for controlling a vehicle to generate a diagnostic signal in response to detecting air-fuel ratio imbalance among engine cylinders.

FIG. 5 is a block diagram illustrating operation of a system or method for controlling a vehicle to generate a diagnostic signal in response to detecting air-fuel ratio imbalance among engine cylinders. Block 510 represents offline testing of a representative engine to determine individual cylinders that have AFR determinations that satisfy predetermined reliability criteria for selected engine operating conditions, which may be specified by engine speed-load points or regions. The representative engine(s) are configured in a similar manner as the engines used on-road at least with respect to components and control strategies that may affect the reliability of the AFR determination, i.e. number of cylinders, arrangement of cylinders, firing order, type of sensor(s), placement of sensor(s), etc. The representative engine(s) may include additional sensors and/or control strategies in a testing environment, such as on a dynamometer or in an instrumented on-road vehicle for example, to determine the operating conditions and associated cylinder(s) for diagnostic monitoring.

The empirical data collected during representative engine development and testing may be used to develop a corresponding lookup table or similar data stored in memory of an on-road vehicle controller as represented at 520. During operation of the vehicle, the controller monitors the AFR of a subset of cylinders identified as reliable based on data from the lookup table for current engine operating conditions as represented at 530. In one example, the lookup table is indexed or accessed based on an engine speed-load point or region. However, other parameters may be utilized based on the empirical testing to provide a desired reliability of the AFR metric and diagnostic monitor completion within an expected desired number of engine cycles.

Signals from one or more sensors may be used to compute an AFR metric for those cylinders for which the AFRIM diagnostic is active/enabled as represented at 540. The sensor(s) and corresponding signals may be selected based on correlation with the AFR for one or more engine cylinders. The computation may include mathematical/statistical operations on the monitored signal or metric, such as averaging or integration, depending on the particular application and implementation.

Block 550 determines whether the AFRIM diagnostic is completed, i.e. whether a predetermined number of measurements or observations have been completed for each cylinder. If not, then the process is repeated as engine operating conditions change and other additional measurements/determinations are obtained for various cylinders. After the predetermined number of observations have been obtained as determined at 550, the AFRIM diagnostic determines whether the observed AFR imbalance exceeds a corresponding threshold at 560. If the threshold has not been exceeded (i.e. nominal AFR imbalance is observed that may be attributed to acceptable part or operating condition variations), the monitor may be repeated continuously as indicated at 530, at periodic intervals, and/or based on a trigger condition, such as an engine start, completion of catalyst warm-up, elapsed time from previous completion, cumulative engine RPMs, etc.

If an AFR imbalance exceeding a corresponding threshold is detected at 560, then the controller generates a diagnostic signal as represented at 570. The diagnostic signal may be used to store a corresponding diagnostic code and/or to alert the operator via a corresponding message, alert, or light, such as illumination of a malfunction indicator light (MM), for example.

As demonstrated by the detailed description of representative examples above, one or more embodiments according to the present disclosure use an individual cylinder-based enablement grid, where the AFR imbalance detection is enabled only for the detectable subset of cylinders at a given engine operating point. The diagnostic is considered complete when measurements over a predetermined number of cycles are completed for each cylinder. The cycles are not necessarily exclusive for any particular cylinder. Rather, the measurements from the same cycle are included for multiple cylinders within the subset of cylinders determined to have reliable detection for that operating condition. This strategy may have various associated advantages including but not limited to expanding AFR imbalance monitoring beyond conditions limited to the detectability of the weakest cylinder of a cylinder group and improving the desired diagnostic completion rate with fewer engine cycles required for a reliable AFR determination relative to prior strategies that required all cylinders associated with a particular sensor to meet monitoring suitability parameters.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments that have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:

an internal combustion engine having a plurality of cylinders;

a sensor configured to generate a sensor signal correlated with an air-fuel ratio of first and second cylinders of the plurality of cylinders; and a controller in communication with the sensor and programmed to monitor the air-fuel ratio of the first cylinder in response to an indication that air-fuel ratio measurements of the first cylinder satisfy predetermined criteria for current engine operating conditions while air-fuel ratio measurements of the second cylinder do not satisfy the predetermined criteria for the current engine operating conditions, wherein the predetermined criteria correspond to a rate of false-positives being less than a first threshold and a rate of false-negatives being less than a second threshold.

2. The vehicle of claim 1 wherein the controller is further programmed to retrieve the indication from a lookup table identifying which of the plurality of cylinders satisfy the predetermined criteria for the current engine operating conditions.

3. The vehicle of claim 2 wherein the current engine operating conditions correspond to one of a plurality of predetermined engine speed-load regions, each of the plurality of cylinders associated with at least one of the speed-load regions where air-fuel ratio measurements satisfy the predetermined criteria.

4. The vehicle of claim 3 wherein at least one of the engine speed-load regions includes the indication that air-fuel ratio measurements satisfy the predetermined criteria for a subset of the plurality of cylinders, the subset including less than all of the plurality of cylinders.

5. The vehicle of claim 1 wherein the controller is further programmed to:
repeatedly monitor the air-fuel ratio for cylinders indicated as satisfying the predetermined criteria for the current operating conditions as engine operating conditions vary until obtaining a predetermined number of air-fuel ratio measurements for each of the plurality of cylinders.

6. The vehicle of claim 5 wherein the controller is further programmed to generate a diagnostic code in response to an air-fuel ratio imbalance exceeding a corresponding threshold after obtaining the predetermined number of air-fuel ratio measurements for each of the plurality of cylinders.

7. The vehicle of claim 1 wherein the sensor comprises a universal exhaust gas oxygen (UEGO) sensor.

8. The vehicle of claim 7 wherein the air-fuel ratio measurements are computed by the controller based on a measure of variation of signals from the UEGO sensor within an engine cycle.

9. The vehicle of claim 1 wherein the current engine operating conditions are specified by a current engine speed and current engine load.

10. A vehicle, comprising:
an internal combustion engine including a plurality of cylinders with at least a first and second cylinder of the plurality of cylinders associated with a sensor configured to provide a signal used in determining air-fuel ratio of the first and second cylinders; and
a vehicle controller programmed to:
monitor air-fuel ratio of cylinders previously identified as having air-fuel ratio determinations that satisfy predetermined criteria for current engine operating conditions, the previously identified cylinders including only one of the first and second cylinders for at least one engine operating condition;
repeat the monitoring of the air-fuel ratio as engine operating conditions change until each of the plurality of cylinders has a predetermined number of air-fuel ratio determinations; and
generate a diagnostic signal in response to an air-fuel ratio variation among the plurality of cylinders exceeding an associated threshold, wherein the associated threshold corresponds to at least one of: a rate of false-positives, and a rate of false-negatives.

11. The vehicle of claim 10 wherein the controller is further programmed to access a lookup table to identify cylinders previously identified as having air-fuel ratio determinations that satisfy predetermined criteria for the current engine operating conditions, the lookup table indexed by an engine speed-load region corresponding to the current engine operating conditions.

12. The vehicle of claim 10 wherein the sensor comprises a universal exhaust gas oxygen (UEGO) sensor and wherein monitoring the air-fuel ratio comprises computing a metric based on a measure of fluctuation of signals from the sensor within an engine cycle.

13. The vehicle of claim 10 wherein the predetermined criteria corresponds to a rate of false-positives and false-negatives for generating the diagnostic signal.

14. The vehicle of claim 10 wherein the controller is further programmed to calculate an average air-fuel ratio variation among the plurality of cylinders, wherein generating the diagnostic signal is in response to the average air-fuel ratio variation exceeding the associated threshold.

15. A vehicle, comprising:
a multi-cylinder internal combustion engine having a sensor associated with a group of cylinders; and
a vehicle controller programmed to:
select a subset of cylinders containing less than all of the group of cylinders for air-fuel ratio monitoring, the subset including cylinders previously identified as having reliable air-fuel ratio determinations based on signals from the sensor for a current engine speed-load operating region;
repeat the selecting of subsets of cylinders for different engine speed-load operating regions until all of the cylinders of the engine have a predetermined number of air-fuel ratio determinations;
generate an air-fuel ratio imbalance signal in response to a difference among the air-fuel ratio determinations for different cylinders exceeding a corresponding threshold; and
control air-fuel ratio of at least one of the group of cylinders responsive to the air-fuel ratio imbalance signal.

16. The vehicle of claim 15 wherein selecting the subset of cylinders comprises retrieving a list of cylinders from a previously stored lookup table accessed by the current engine speed-load operating region.

17. The vehicle of claim 16 wherein the controller is further programmed to identify cylinders as having reliable air-fuel ratio determinations by measuring air-fuel ratio of each cylinder using a second sensor for each of a plurality of engine speed-load regions for a representative test engine having a same number of cylinders as the multi-cylinder internal combustion engine.

18. The vehicle of claim 17 wherein the controller is programmed to identify cylinders as having reliable air-fuel ratio determinations by excluding cylinders having a false-positive rate above a corresponding threshold, the false-positive rate associated with determining an air-fuel ratio imbalance above a corresponding threshold.

19. The vehicle of claim 17 wherein the controller is programmed to identify cylinders as having reliable air-fuel ratio determinations by excluding cylinders having a false-negative rate above a corresponding threshold, the false-negative rate associated with detecting an air-fuel ratio imbalance based on signals from the second sensor but not the sensor associated with the group of cylinders.

* * * * *